United States Patent
Takahashi et al.

(10) Patent No.: US 8,732,463 B2
(45) Date of Patent: May 20, 2014

(54) DATA TRANSMITTING APPARATUS AND DATA AUTHENTICATING METHOD

(75) Inventors: Toshinari Takahashi, Tokyo (JP); Fangming Zhao, Saitama (JP); Shinji Yamanaka, Tokyo (JP); Yuichi Komano, Kawasaki (JP); Kentaro Umesawa, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 147 days.

(21) Appl. No.: 13/227,749

(22) Filed: Sep. 8, 2011

(65) Prior Publication Data

US 2012/0233461 A1    Sep. 13, 2012

(30) Foreign Application Priority Data

Mar. 7, 2011   (JP) ................................ 2011-049412

(51) Int. Cl.
*H04L 29/06*   (2006.01)

(52) U.S. Cl.
USPC ................... 713/168; 713/189; 726/2; 726/3; 726/4

(58) Field of Classification Search
USPC ............................... 713/168, 189; 726/2, 3, 4
See application file for complete search history.

(56) References Cited

U.S. PATENT DOCUMENTS

| 5,511,122 | A * | 4/1996 | Atkinson | 713/153 |
| 6,839,434 | B1 * | 1/2005 | Mizikovsky | 380/247 |
| 7,207,061 | B2 * | 4/2007 | Martin | 726/11 |
| 8,386,800 | B2 * | 2/2013 | Kocher et al. | 713/189 |
| 2003/0005284 | A1 * | 1/2003 | Euchner | 713/152 |
| 2003/0046409 | A1 * | 3/2003 | Graham | 709/229 |
| 2003/0056097 | A1 * | 3/2003 | Araki et al. | 713/168 |
| 2003/0177398 | A1 * | 9/2003 | Safa | 713/201 |
| 2004/0205210 | A1 * | 10/2004 | Hamano | 709/230 |
| 2005/0102503 | A1 * | 5/2005 | Imai | 713/156 |
| 2006/0126845 | A1 * | 6/2006 | Zheng | 380/270 |
| 2006/0133613 | A1 * | 6/2006 | Ando et al. | 380/270 |
| 2008/0010218 | A1 * | 1/2008 | Zank | 705/75 |

(Continued)

FOREIGN PATENT DOCUMENTS

| JP | 2003-091503 | 3/2003 |
| JP | 2003-115026 | 4/2003 |

(Continued)

OTHER PUBLICATIONS

HMAC: Keyed-Hashing for Message Authentication, H. Krawczyk et al., Feb. 1997.

(Continued)

*Primary Examiner* — Cordelia Zecher
*Assistant Examiner* — Sarah Su
(74) *Attorney, Agent, or Firm* — Nixon & Vanderhye, P.C.

(57) ABSTRACT

According to an aspect of the present invention, there is provided a data transmitting apparatus including an authenticator generating unit and a communicating unit. The authenticator generating unit generates a first authenticator by using a first encryption key and generates a second authenticator including a first to an n-th fragment information items by using a second encryption key. The communicating unit transmits a first packet including the first authenticator and the first fragment information item to a destination device and, after the first packet is transmitted, if a response indicating successful authentication is not received from the destination device within a certain period, sequentially transmits an i-th packet (i is an integer being 2 or more and n or less) including the i-th fragment information item to the destination device.

7 Claims, 13 Drawing Sheets

(56) References Cited

U.S. PATENT DOCUMENTS

| | | | |
|---|---|---|---|
| 2008/0022092 A1* | 1/2008 | Sakaguchi | 713/160 |
| 2008/0066184 A1* | 3/2008 | Ben-Ami et al. | 726/27 |
| 2008/0115194 A1* | 5/2008 | Apostolopoulos | 726/4 |
| 2008/0181403 A1* | 7/2008 | Sakamoto | 380/258 |
| 2008/0301776 A1* | 12/2008 | Weatherford | 726/3 |
| 2009/0154496 A1* | 6/2009 | Fujinami | 370/469 |
| 2009/0249490 A1* | 10/2009 | Umesawa et al. | 726/26 |
| 2009/0271860 A1* | 10/2009 | Nonaka et al. | 726/16 |
| 2010/0132025 A1 | 5/2010 | Imai | |
| 2010/0293377 A1* | 11/2010 | Tardo | 713/168 |
| 2011/0321145 A1* | 12/2011 | Shimotono | 726/7 |
| 2012/0054495 A1* | 3/2012 | Takahashi et al. | 713/176 |
| 2013/0129093 A1* | 5/2013 | Patel | 380/270 |
| 2013/0246801 A1* | 9/2013 | Takahashi et al. | 713/178 |

FOREIGN PATENT DOCUMENTS

| | | | |
|---|---|---|---|
| JP | 2005-130445 | 5/2005 | |
| JP | 2010-508719 | 3/2010 | |
| WO | 2008/052137 | 5/2008 | |
| WO | WO 2010024379 A1 * | 3/2010 | H04L 9/32 |

OTHER PUBLICATIONS

Office Action dated Feb. 19, 2013 in JP Application No. 2011-049412 with English-language translation thereof.

* cited by examiner

COMMUNICATION HISTORY DB

| DESTINATION | RECORD NUMBER | AUTHENTICATION 1 PASSES | AUTHENTICATION 2 PASSES |
|---|---|---|---|
| MDMS-1 | 1 (MOST RECENT) | OK | NG |
|  | 2 | OK | OK |
|  | 3 | OK | NG |
| MDMS-2 | 1 (MOST RECENT) | NG | OK |
|  | 2 | NG | OK |
|  | 3 | NG | OK |

FIG. 12

DATA TRANSMITTING APPARATUS AND DATA AUTHENTICATING METHOD

CROSS REFERENCE TO RELATED APPLICATIONS

This application is based upon and claims the benefit of priority from the prior Japanese Patent Application No. 2011-049412, filed on Mar. 7, 2011, the entire contents of which are incorporated herein by reference.

FIELD

Embodiments of the present invention relate to a data transmitting apparatus and a data authenticating method.

BACKGROUND

In data authentication of communicating devices, there is a general way to insert authenticators into authenticator storing fields such as IP option fields. To generate an authenticator, for example, HMAC, which uses a secret key pre-shared and a one-way function predefined with an opposite device for carrying out authentication, can be used.

However, in a case where a network is managed by end users or a provider (another company), such as a case where a smart grid is operated, because properties of network devices such as routers cannot be managed/operated, sometimes values of authenticator storing fields are discarded by properties of routers on the Internet and authentication cannot be performed.

To address such a case, there is a technique for writing an authenticator into an area that is small (compared with the size of the authenticator) and not to be discarded, such as a TCP header, and transmitting a plurality of packets to request authentication. For example, a method is known which writes a piece of information of an authenticator into a destination port number of a TCP header, and opens an actual communication port after authentication.

A method of performing authentication by transmitting a plurality of packets has an advantage that network passability is improved even if there are a variety of properties of communicating devices, and a high probability of communication is guaranteed. On the other hand, there is a problem that an increased number of packets may lead to lower communication performance and a problem that because a server receiving these packets cannot complete the authentication processing by receiving one packet, the management of communication sessions is complicated, resulting in an increased processing load. In a large number of cases, authentication can be performed without transmitting a plurality of packets, but in order to improve network passability, it is necessary to transmit a plurality of packets, which cause heavy-load processing, in all communications, so that efficiency is disadvantageously reduced.

On the other hand, in order to continuously select the best authenticating method to prevent this, it is necessary to know which of authenticators can pass through a network for each communication path. However, in operation of smart grids or the like, a large number of devices on networks are managed by end users or providers, so that the managing sides such as electric power companies that manage the smart grids cannot know in advance selections and settings of models/functions of the devices. Therefore, the management that selects a suitable authenticating method for each network property and changes a present method to the suitable one is unfeasible in operation, so that a data authenticating method that can be used commonly in different network environments without the trouble of the management is needed.

BRIEF DESCRIPTION OF THE DRAWINGS

FIG. 12 illustrates an example of information stored in a communication history database of a third embodiment;

DETAILED DESCRIPTION

According to an aspect of the present invention, there is provided a data transmitting apparatus including an authenticator generating unit and a communicating unit.

The authenticator generating unit generates a first authenticator by using a first encryption key and generates a second authenticator including a first to an n-th fragment information items by using a second encryption key.

The communicating unit transmits a first packet including the first authenticator and the first fragment information item to a destination device and, after the first packet is transmitted, if a response indicating successful authentication is not received from the destination device within a certain period, sequentially transmits an i-th packet (i is an integer being 2 or more and n or less) including the i-th fragment information item to the destination device.

Hereinafter, embodiments according to the present invention will be described in detail with reference to the drawings.

First Embodiment

Figure 1:
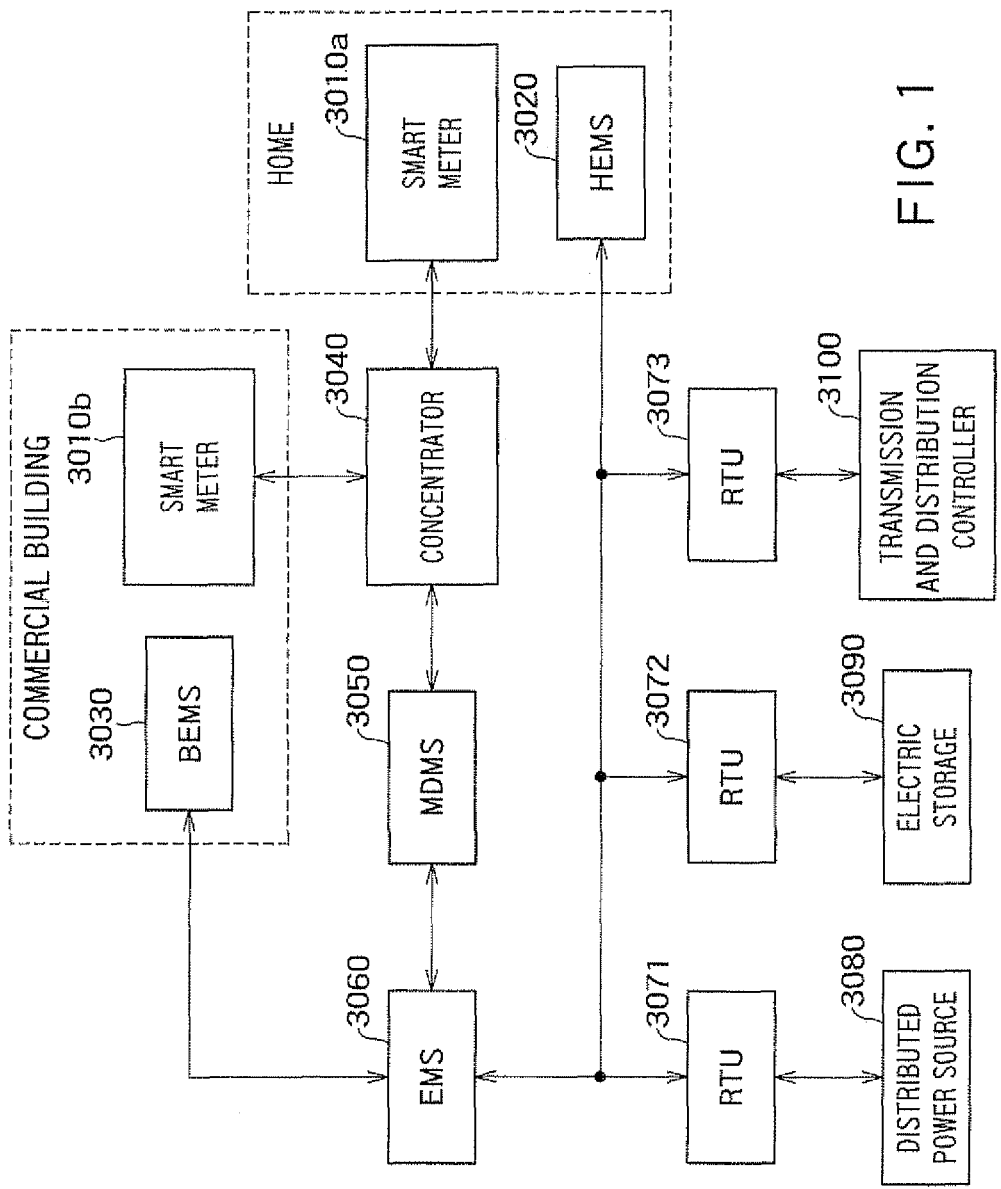
FIG. 1 illustrates an example of an overall configuration of a system according to a first embodiment.

FIG. 1 illustrates a configuration example of a next-generation power communication network (a smart grid). Specifically, FIG. 1 illustrates an example of a layout of client devices that use a data authenticating method according to the present embodiment and devices cooperating with each other on a system of the smart grid. These devices are connected with each other through a public network such as the Internet.

In the smart grid, a smart meter 3010a for accumulating an amount of power usage and a HEMS (Home Energy Management System) 3020, which is a home server for managing household electrical devices, are installed in each home. Also, for commercial buildings, a BEMS (Building Energy Management System) 3030, which is a server for managing electrical devices in a building, is installed in each building. Smart meters 3010b, which are similar to the smart meter 3010a, are installed in the commercial buildings. Hereinafter, the smart meter 3010a or the smart meter 3010b is simply referred to as a smart meter.

The smart meters are aggregated through a concentrator (repeater) 3040 by several meters, and communicate with an MDMS (Meter Data Management System) 3050 via a communication network. The MDMS 3050 receives and stores an amount of power usage from a smart meter in each home at regular intervals. An EMS (Energy Management System) 3060 controls power for a smart meter, the HEMS 3020, the BEMS 3030, and the like on the basis of amounts of power usage of a plurality of homes accumulated in the MDMS 3050 or information from a sensor installed in a power system. For example, the EMS 3060 requests the smart meter, the HEMS 3020, the BEMS 3030, and the like to reduce their power use. In addition, the EMS 3060 controls a distributed power source 3080 for solar power generation, wind power generation, or the like connected to an RTU (Remote Terminal Unit) 3071, an electric storage 3090 similarly connected to an RTU 3072, and a transmission and distribution controller 3100 connected to an RTU 3073, for controlling an amount of power transmission from the power generating side. Specifically, the EMS 3060 controls them to stabilize the voltage and frequencies of an entire power system network.

Figure 2:
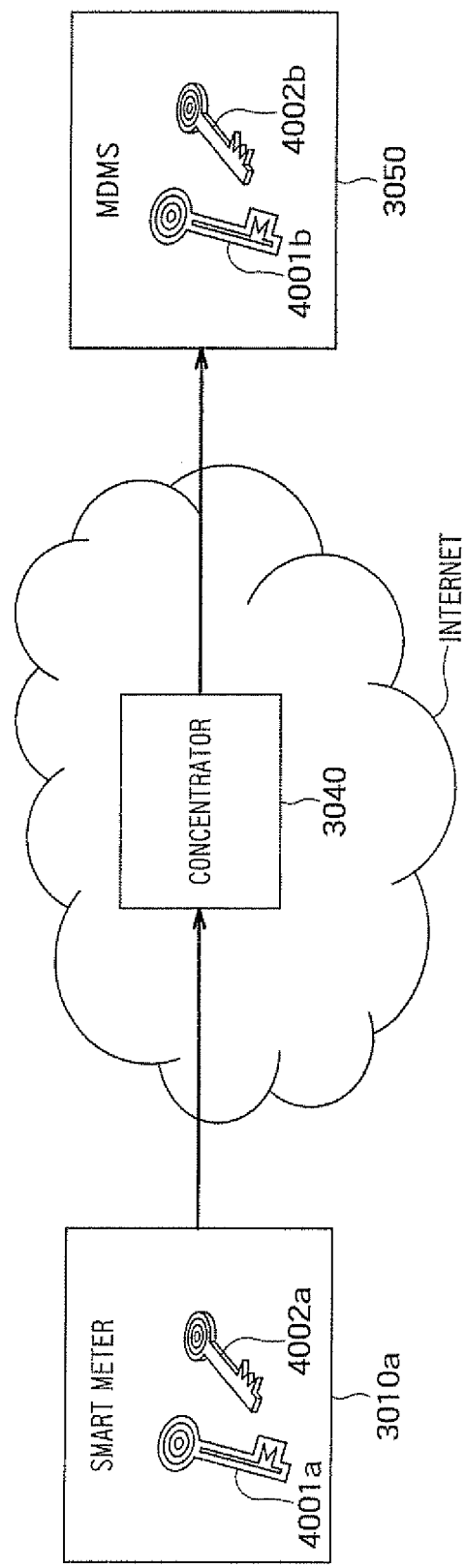
FIG. 2 is a drawing for illustrating an outline of an operation of the system according to the first embodiment.

As illustrated in FIG. 1, in a smart grid, a variety of devices are connected with each other via a network, many of which involve the control of a power system network, so that it is required to prevent terrorists or the like from transmitting unauthorized data and therefore it is necessary to authenticate all data items. The present embodiment can be applied to data authentication between arbitrary devices composing a smart grid, and the embodiment is not limited to a particular device. For example, if the home smart meter 3010a transmits data and the MDMS 3050 receives the data, a client-side data authenticating scheme of the present embodiment can be applied to the smart meter 3010a, which is a data sending client. In FIG. 2, this part is focused and the present embodiment is simplified for easy understanding.

FIG. 2 illustrates an example in which the scheme of the present embodiment is used when the smart meter 3010a transmits a data packet to the MDMS 3050 through the concentrator 3040 by using a network line (such as the Internet). The smart meter 3010a, which is a data transmitting client, prestores a first key 4001a and a second key 4002a. On the other hand, the MDMS 3050, which is a data receiving server, prestores a first key 4001b and a second key 4002b. The key 4001a and the key 4001b are a pair in terms of an encryption technique. For example, when authentication that uses common keys is performed, the key 4001a and the key 4001b have a same value. Alternately, when authentication that uses public keys is performed, the key 4001a and the key 4001b bear a relationship between a public key and a secret key in a public-key cryptosystem. The properties of the keys are only illustrative and not limited as long as the key 4001a and the key 4001b are a pair in terms of an encryption theory. Likewise, the key 4002a and the key 4002b are a pair in terms of an encryption technique. A way to use these keys will be described later.

When the smart meter 3010a transmits a packet to the MDMS 3050, the smart meter 3010a adds an authenticator generated by using the first key 4001a and the second key 4002a in a scheme specific to the present embodiment, to the packet to be transmitted, thereafter transmitting the packet. On the other hand, the MDMS 3050 that has received the packet uses the first key 4001b and the second key 4002b to verify the authenticator added to the packet. If an authorized authenticator is attached, the MDMS 3050 accepts the packet; otherwise, the MDMS 3050 regards the packet as a packet sent from an unauthorized device (i.e., an attack packet) and does not accept the packet.

It should be noted that in the present embodiment, it is assumed that the concentrator 3040, through which a packet passes, has only a function to forward a packet and does not verify an authenticator. However, of course, the scheme of the present embodiment may also be applied to the concentrator 3040 in the same manner. In addition, it is needless to say that authentication according to another conventional art can be performed.

Also, in the description of the present embodiment, the first key and the second key are assumed to be different from each other for the purpose of providing a general description, but the first key and the second key may be the same key.

Figure 3:
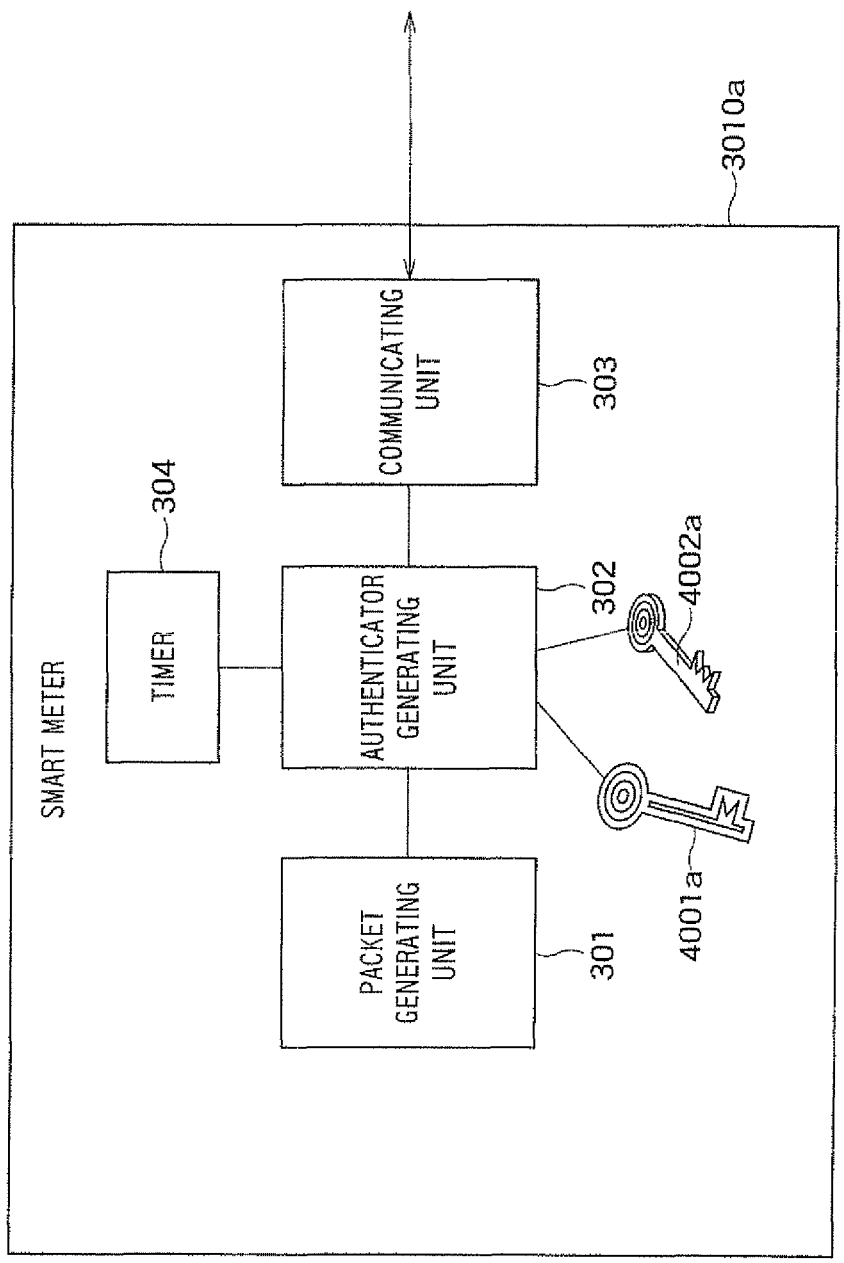
FIG. 3 is a schematic block diagram of a smart meter according to the first embodiment.

FIG. 3 illustrates the data transmission by the smart meter 3010a in FIG. 2 in more detail. The packet generating unit 301 is a section for generating a data packet to be transmitted. When communication is performed on the Internet, since usually IP (Internet Protocol) communication is used, it is assumed that the packet generating unit 301 generates an IP packet. This is a function that general communicating devices have; description of which will be omitted. If the authenticator generating unit 302 determines that an IP packet is to be transmitted to the MDMS 3050, then the authenticator generating unit 302 generates an authenticator as follows by using the first key 4001a and the second key 4002a being keys associated with the MDMS 3050. Because a destination IP address is written in a header portion of an IP packet, a destination device can be identified by referring to the field.

Here, only a case in which a destination is the MDMS 3050 is described, so that keys to be used are only one pair of the key 4001a and the key 4002a in this case. However, if there are a plurality of destinations to which data is transmitted, a different key may be used for each destination. In this case, by referring to a table holding associations of destination devices with keys to create authenticators for the devices, the first key and the second key may be obtained. Since means for achieving this application is obvious, a detail description thereof will be omitted.

First, the authenticator generating unit 302 uses the first key 4001a to generate an authenticator associated with a packet to be transmitted. In regard to an algorithm to generate the authenticator, various schemes conventionally known can be used and the schemes are not specifically limited. For example, the hmac scheme may be used to generate an authenticator with data of a packet and a key as inputs. In the hmac scheme, if data and a key, which are inputs, are identical, an identical authenticator is generated without exception, so that in order to enhance security, a value of a timer 304 (a current time) may be used as an input to generate a different authenticator even from the same data. Alternatively, a serial number that is added each time a packet is transmitted may be used as an input instead of the value of the timer 304.

Through such a procedure, the authenticator generating unit 302 uses a packet and the key 4001a to generate the first authenticator, and uses the packet and the key 4002a to generate the second authenticator in the same manner.

In the foregoing, the first authenticator and the second authenticator have the same property and no differences, but a way to transmit the first authenticator and a way to transmit the second authenticator are different from each other. Therefore, these ways will be described.

First, the way to transmit the first authenticator will be described. The first authenticator is simply added by the authenticator generating unit 302 to the same IP packet as that of the data to be transmitted, as data in an authenticator storing field, and then transmitted. Because an adding method desirably complies with existing IP (Internet protocol) specifications, the first authenticator is stored, for example, as data in an optional portion of an IP header. As other storing places, an optional portion of a TCP header, a data portion of a TCP header having no data, such as TCP/SYN, and the like are possible. Also, an AH (Authentication Header) in a recently extended IPsec protocol corresponds to the authenticator storing field.

Figure 4:
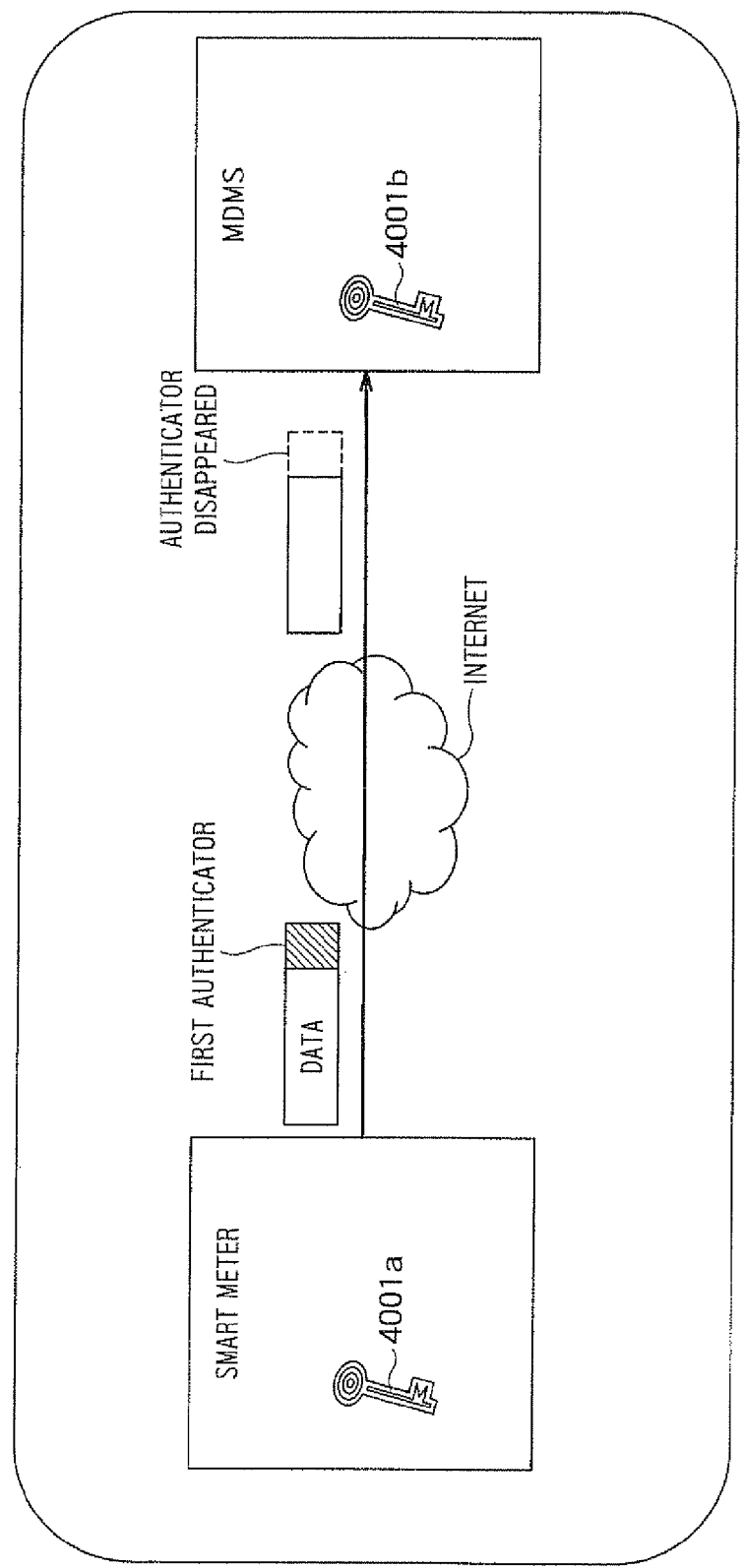
FIG. 4 illustrates an example of an authenticating scheme that uses only a first authenticator.

In the data authenticating method that uses only the first authenticator, as a concept of the method is illustrated in FIG. 4, the smart meter adds the first authenticator generated by using the key 4001a to an IP packet and transmits the packet to the MDMS via a network line (such as the Internet). The MDMS verifies the received first authenticator by using the key 4001b. Such an authenticating method poses a problem that sometimes the first authenticator does not go through a communication path and disappears, and the MDMS cannot verify the authenticator.

It is because smart meters are devices installed in ordinary homes and therefore it is not guaranteed what network device a particular home uses. For example, in inexpensive home routers for only Internet browsing, the IP (Internet protocol) and the like are not necessarily fully implemented, which causes an unexpected situation where information of the field including the first authenticator is not transferred.

In operation of the smart grid, since devices at all the ordinary homes cannot be checked in advance, in a data authenticating method that uses only a first authenticator, it is unclear whether or not communications between a smart meter and an MDMS are guaranteed until the smart grid is actually operated. Thus, this is not desirable as the feature of the smart grid, which is social infrastructure.

Now, a method for transmitting the second authenticator will be described. The second authenticator is inserted into an IP packet without adding an authenticator storing field. That is, a redundant portion of an IP packet has an authenticator fragment insertion field, into which the second authenticator is inserted. For example, a SYN packet in TCP has a "sequence number" field, a "window size" field, and an "acknowledgement number" field for the purpose of compatibility, but they are meaningless data, so that the second authenticator can be inserted thereinto. However, because a size of a redundant portion of an IP packet, namely, a size of an authenticator fragment insertion field cannot typically be large, the size is too small to insert the second authenticator thereinto, so that the second authenticator is divided into a plurality of fragments, each of which is inserted into an authenticator fragment insertion field of each of different IP packets.

Also, typically, since meaningless fields do not hold information, the fields might be deleted during data transfer. Therefore, a "destination port number" field may be used as a field being less prone to be deleted. Essentially, this is data for designating a server-side port number, but assuming that a dedicated server implemented in the MDMS is accessed, the data can be used for authenticating data insertion.

Figure 5:
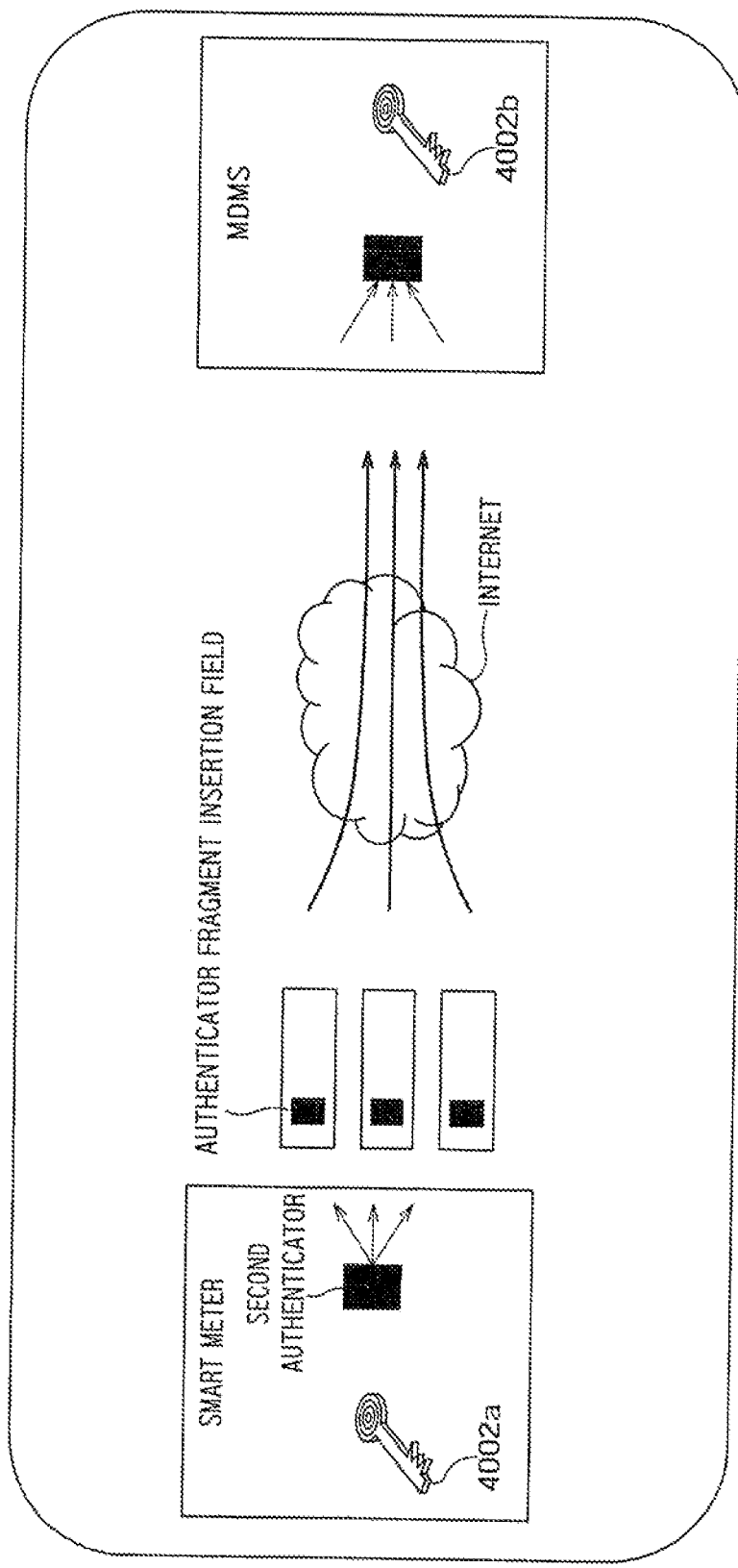
FIG. 5 illustrates an example of an authenticating scheme that uses only a second authenticator.

In a data authenticating method that uses only the second authenticator, as a concept of the method is illustrated in FIG. 5, the smart meter inserts the second authenticator generated by using the key 4002a into authenticator fragment insertion fields of a plurality of IP packets and transmits the packets via a network line (such as the Internet) to the MDMS. The MDMS verifies the received second authenticator by using the key 4002b, but the MDMS has to transmit a plurality of IP packets for the purpose of only one authentication, resulting in heavy processing of the smart meter. In general, because smart meters are devices that use inexpensive hardware, the disadvantage is unacceptable. Furthermore, in the MDMS, which is a server, heavy processing is required. Specifically, the MDMS needs to distinguish these IP packets from other communications and manage a session. Thus, in the data authenticating method that uses only the second authenticator, while network transparency is improved, there arise a large number of problems in implementation.

The present embodiment proposes a method of attaching an authenticator in which authentication by a first authenticator, namely, a way to attach an authenticator to one packet and authentication by a second authenticator, namely, a way to perform authentication by using a plurality of packets are combined as appropriate to take advantage of the characteristics of both the ways. In this method, if only one packet can perform authentication, the authentication can be completed with light processing and only if one packet is insufficient, authentication is performed by using a plurality of packets to enable both a processing speed and likelihood of connection to be increased. That is, while the increase of a load is minimized, the network passability can be improved.

Figure 6:
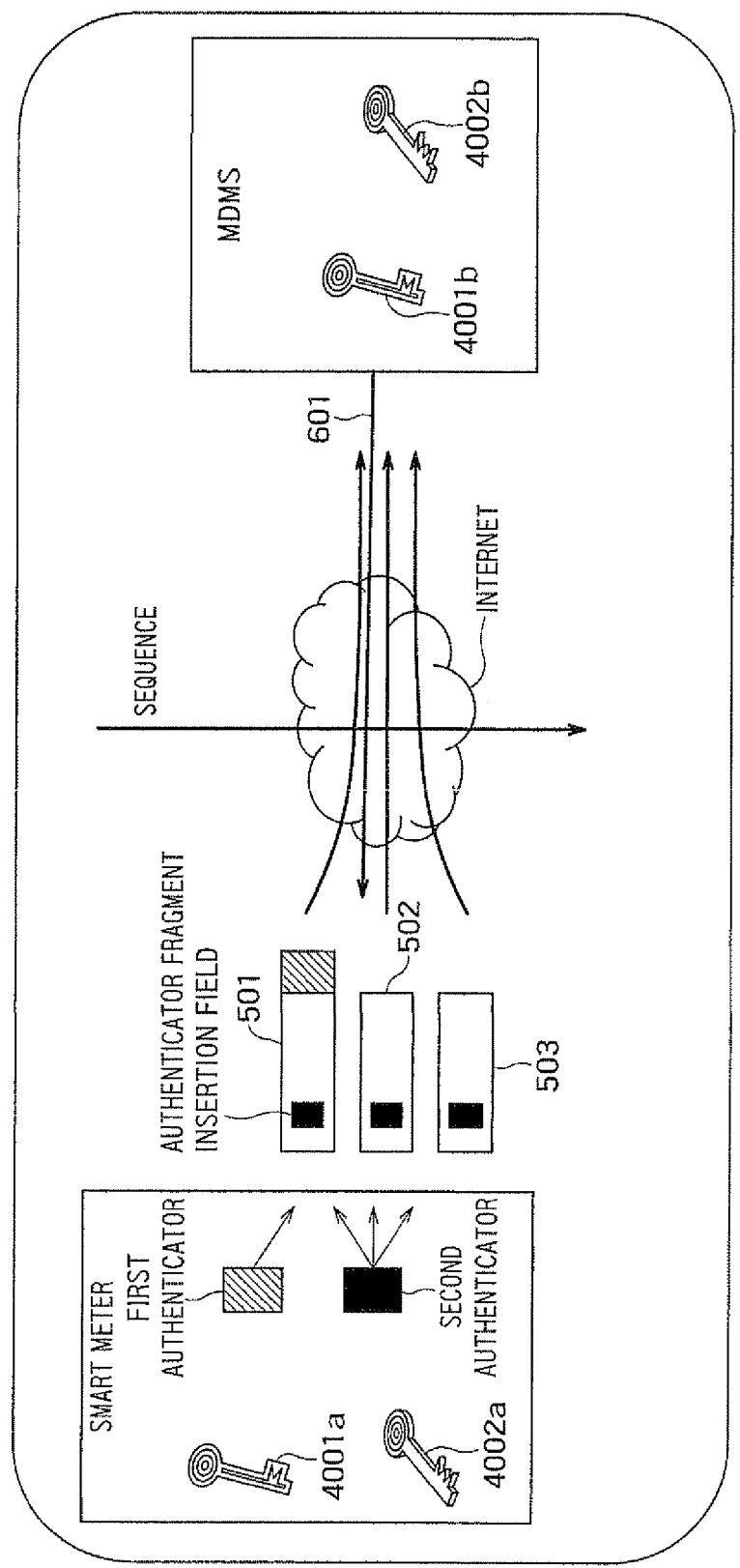
FIG. 6 illustrates an outline of an operation of packet transmission according to the first embodiment.
Figure 7:
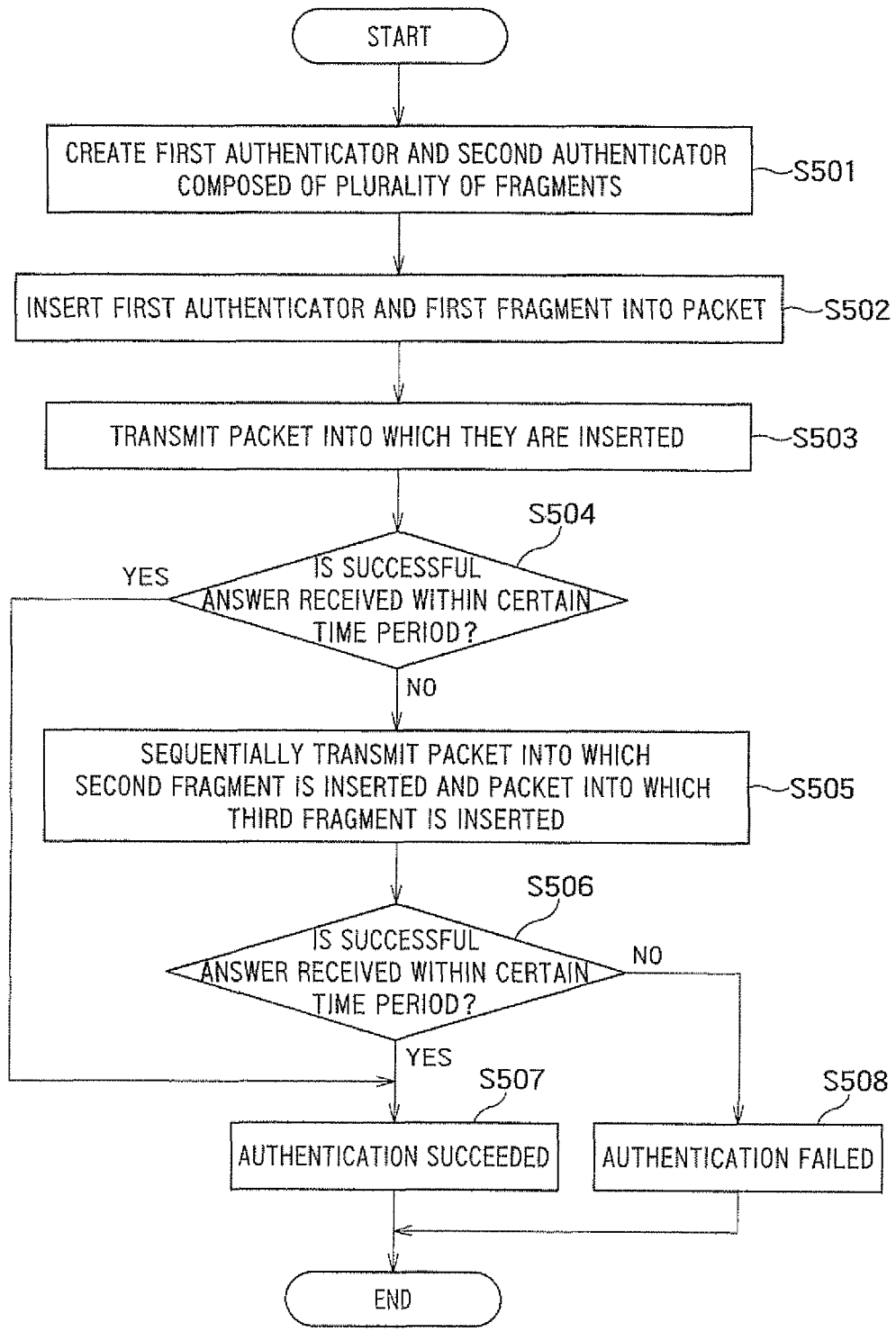
FIG. 7 is a flow chart showing a flow of an operation of the smart meter of the first embodiment.

FIG. 6 illustrates a summary of a process in which a variety of authenticators are transmitted in the present embodiment. FIG. 7 is a flow chart showing a flow of an operation of the smart meter illustrated in FIG. 3.

The authenticator generating unit 302 creates the first authenticator by using the first key 4001a and creates the second authenticator composed of a plurality of (now three) fragments by using the second key 4002a (step S501).

When the smart meter transmits data to the MDMS, the authenticator generating unit 302 of the smart meter adds the first authenticator created by using the first key 4001a to the first IP packet 501, and inserts a first fragment of the three fragments divided from the second authenticator created by using the second key 4002a, into the authenticator fragment insertion field (step S502).

The smart meter transmits the first packet, in which the first authenticator and the first fragment are inserted, to the MDMS, which is a destination device, through the communicating unit 303 and a network such as the Internet (step S503). An example of the authenticator generating procedure has been described in detail with reference to FIG. 3, so that redundant description will be omitted.

In this example, it is assumed that the second authenticator is divided into three portions, but the number of division is not limited as long as a plurality of (n) portions are obtained. The larger the number of division, the more information items can be transmitted as authenticators, but the excessive number of information items is not preferable because a communication load increases. The division number should be kept to a minimum within the range in which the second authenticator can be stored.

Figure 8:
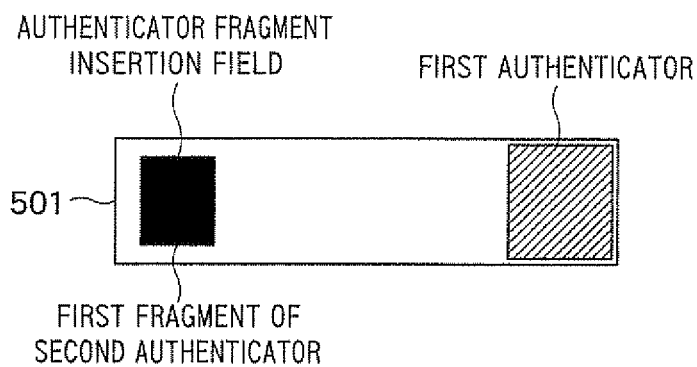
FIG. 8 illustrates an example of a first IP packet.

FIG. 8 extracts from FIG. 6 only a state in which the first IP packet is transmitted from the smart meter. It is desirable for the MDMS to receive the first IP packet shown in FIG. 8 as it is, but as described before, the packet cannot necessarily pass as it is due to properties of communication paths. A piece of information may be lost. Data of the first IP packet at the time of the MDMS receiving it can be classified into the four patterns in FIG. 9(A) to FIG. 9(D) depending on the presence or absence of the first authenticator and the first fragment of the second authenticator.

Figure 9:
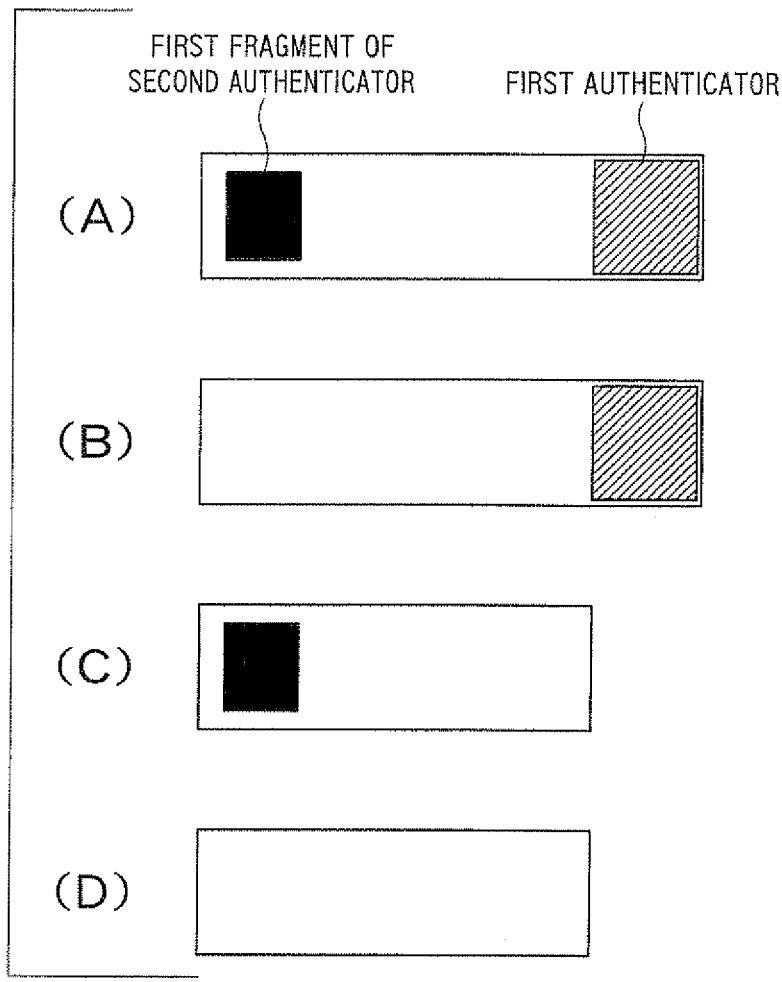
FIGS. 9(A) to 9(D) illustrate structure patterns of packets that can be received by an MDMS from the smart meter.

First, as shown in FIG. 9(A), if both the first authenticator and the first fragment of the second authenticator reach the MDMS, the authentication succeeds by only the first authenticator. That is, if the first authenticator is checked by using the key 4001*b*, it can be proven that the IP packet has been transmitted from the smart meter having the key 4001*a*. Also, as shown in FIG. 9(B), if the first authenticator is received and the first fragment of the second authenticator is not received, similarly, the authentication succeeds by only the first authenticator. These are the simplest cases; the MDMS transmits an answer 601 indicating successful authentication to the smart meter. The answer 601 may have any format and the present embodiment does not specifically limit a data structure thereof. For example, if the communication is TCP/IP, the answer 601 corresponds to a server response (a SYN/ACK packet) in a three-way handshake of TCP.

FIG. 9(C) and FIG. 9(D) show a case in which the first authenticator is not received. This situation may include a case in which the addition field itself in which the first authenticator is inserted is lost during communication and a case in which the addition field is left, but the first authenticator data in the field has disappeared. However, these cases have the same meaning and FIG. 9(C) and FIG. 9(D) show the former case.

In FIG. 9(C), the first authenticator has not been received, but the first fragment of the second authenticator has been received. In this case, if the other fragments of the second authenticator are also received, the second authenticator can be confirmed by using the key 4002*b*, but the second authenticator cannot be confirmed since they have not been received yet. Therefore, the MDMS does not transmit the answer 601 indicating successful authentication to the smart meter.

As shown in FIG. 9(D), if both the first authenticator and the first fragment of the second authenticator are not received, the MDMS does not also transmit the answer 601 indicating successful authentication to the smart meter. However, unlike the case of FIG. 9(C), in any case, since it cannot be expected that the authenticator will be received, at this time the MDMS may determine that this is an authentication error and transmit an answer indicating the authentication error to the smart meter. Such a case of FIG. 9(D) occurs only when a network device is operated in an extremely protective manner, so that the case does not need to be taken into account in actual system designs.

On the other hand, depending on whether or not the smart meter receives the answer 601 indicating successful authentication, it can be determined whether or not the authentication by the MDMS has succeeded. However, in general, because the smart meter cannot know in advance when it will receive the answer, in the worst case, the determination cannot be made because an answer is never received, which is impractical. Thus, an implementation in which the smart meter times out after a certain time period may be preferable.

After the authenticator generating unit 302 of the smart meter transmits the first IP packet 501, the authenticator generating unit 302 checks whether the communicating unit 303 receives the answer 601 indicating successful authentication within a certain time period (step S504). If the answer 601 has not been received, the authenticator generating unit 302 determines that the MDMS failed to perform authentication by the first authenticator, that is, it is highly likely that this is a case of FIG. 9(C), and the authenticator generating unit 302 sequentially transmits the second IP packet 502 and the third IP packet 503 (step S505). If the answer 601 has been received, the authenticator generating unit 302 determines that the authentication has succeeded (step S507), and carries out subsequent communications.

In an authenticator fragment insertion field of the second IP packet 502, the second one of the three fragments divided from the second authenticator created by using the second key 4002*a* is inserted, and the packet 502 is transmitted to the MDMS through the communicating unit 303 and a network such as the Internet (step S505). The second authenticator is an authenticator calculated by using the information of the already transmitted first IP packet 501, so that the second authenticator is not for authenticating the information of the second IP packet. The second IP packet is transmitted in order to give the MDMS an authenticator fragment necessary for the MDMS to authenticate the first IP packet. Therefore, the second IP packet may be a data packet that is not particularly required to be authenticated as well as may be dummy data used for the sole purpose of transmitting an authenticator fragment.

In an authenticator fragment insertion field of the third IP packet 503, the third one of the three fragments divided from the second authenticator created by using the second key 4002*a* is inserted, and the packet 503 is transmitted to the MDMS through the communicating unit 303 and the network such as the Internet (step S505).

The MDMS can obtain the second and the third fragments of the three fragments divided from the second authenticator by receiving the second IP packet and the third IP packet. As described before, since the MOMS has already obtained the first fragment of the three fragments divided from the second authenticator, now the MDMS can combine all the fragments of the second authenticator into the second authenticator and use the second authenticator to prove that the data of the first IP packet has been transmitted from the authorized smart meter, namely, the smart meter having the secret keys 4001*a* and 4002*a*.

The authenticator generating unit 302 of the smart meter checks whether or not the communicating unit 303 has received, after the third IP packet is transmitted, the answer 601 indicating successful authentication within a certain time period (step S506). If the answer 601 has been received, the authenticator generating unit 302 determines that the authentication has succeeded (step S507), and carries out subsequent communications. If the answer 601 has not been received, the authenticator generating unit 302 determines that the authentication has failed (step S508). In this case, the processing may immediately proceed to end as failed authentication. In general, however, in IP communications, a piece of a packet sometimes disappears during transfer due to network congestion or the like, which may cause authentication to fail, so that a retry may result in a success. Therefore, instead of the processing immediately proceeding to end, an authentication procedure may be performed again from the start of step S501 or from step S505.

In the procedure described in detail above, if the network between the smart meter and the MDMS allows the first authenticator to pass, quick authentication can be performed by using the first authenticator. Also, even if the first authenticator does not pass and the authentication by the first authenticator cannot be performed, reliable authentication can be performed by using the second authenticator transmitted from the smart meter in divided portions. As a result, both processing speed and likelihood of connection can be increased. That is, the data authentication that minimizes the increase of a load and increases network passability is achieved.

As described in detail above, the present embodiment provides high performance (processing speed and likelihood of connection) with low operation costs. It is because in smart grid networks where in communication lines such as the Internet, a plurality of communicating devices configuring the lines and having different characteristics coexist and packet filtering of a variety of policies is performed since different providers manage the smart grid networks, when data authentication is performed between the devices, without setting the best authenticating method in advance for each characteristic of the communication lines through which the devices are connected with each other, a high-performance authenticating scheme or an authenticating scheme having higher connectivity is automatically selected.

Second Embodiment

In the first embodiment, after the smart meter transmits the first IP packet 501, if the answer 601 indicating successful authentication is not received within a certain time period, the second IP packet 502 and the third IP packet 503 are sequentially transmitted.

In the present embodiment, after the smart meter transmits the first IP packet 501, if the answer 601 indicating successful authentication is not received within a certain time period, the second IP packet 502 is transmitted. The steps until the second IP packet 502 is transmitted are the same as in the first embodiment described above.

Figure 10:
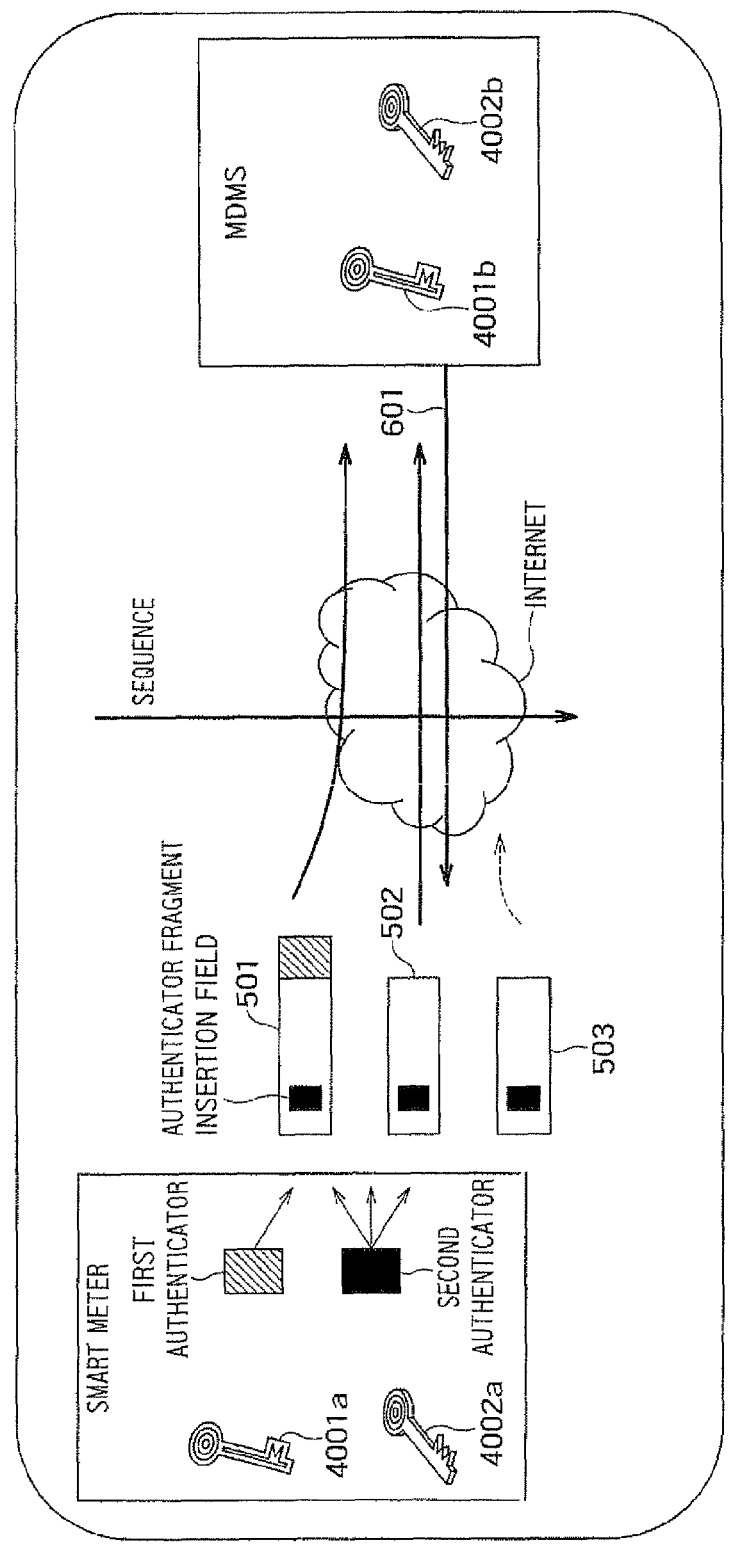
FIG. 10 illustrates an outline of an operation of packet transmission of a second embodiment.
Figure 11:
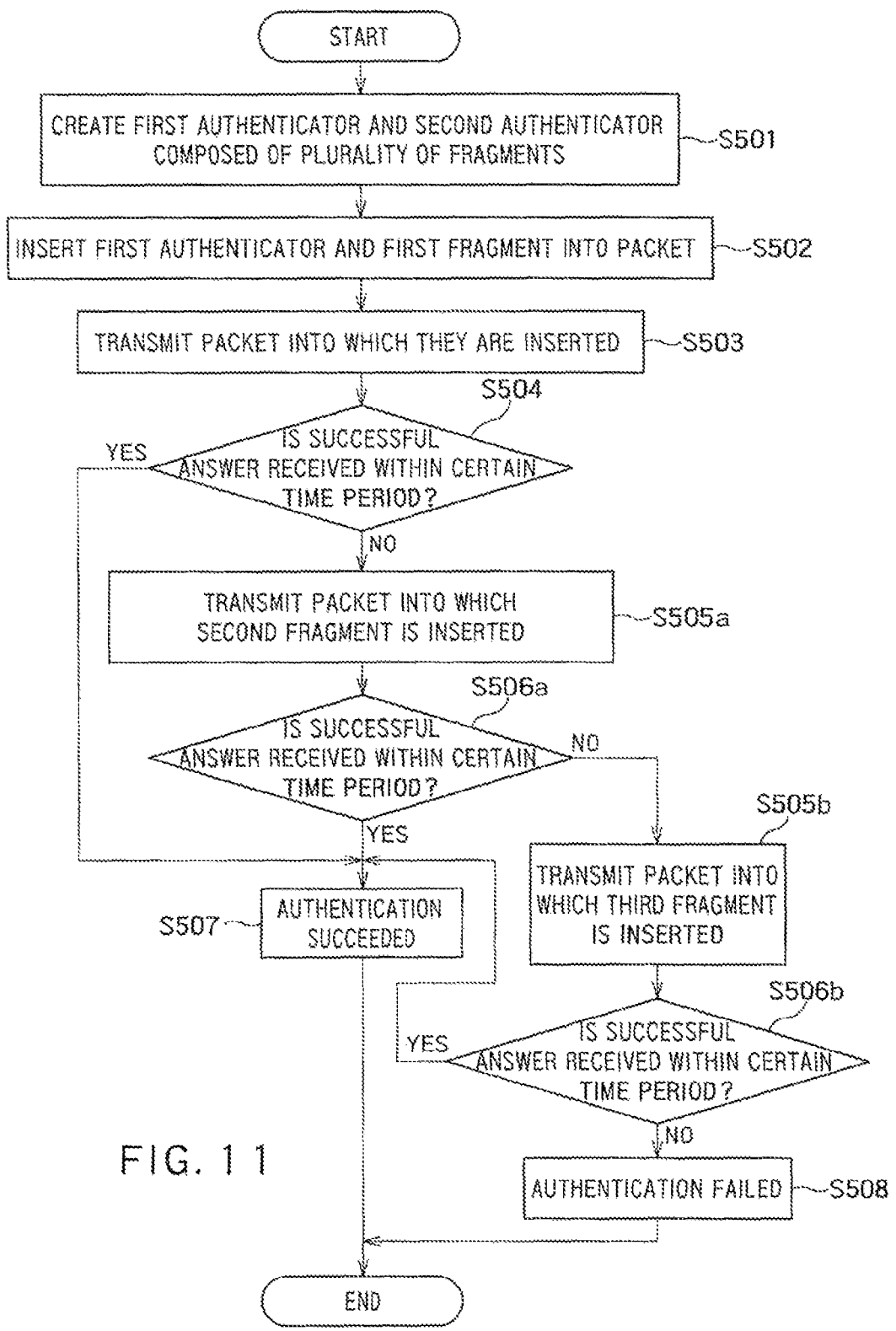
FIG. 11 is a flow chart showing a flow of an operation of a smart meter of the second embodiment.

FIG. 10 illustrates a summary of a process in which a variety of authenticators are transmitted in the present embodiment. FIG. 11 is a flow chart showing a flow of an operation of the smart meter according to the present embodiment.

In the present embodiment, the smart meter transmits the second IP packet 502 (step S505a), and then determines whether or not the answer 601 indicating successful authentication has been received within a certain time period (step S506a). If the answer 601 has not been received, the smart meter transmits the third IP packet 503 (step S505b), and thereafter, if the smart meter receives a response within a certain period (S506b), the smart meter determines that the authentication has succeeded (step S507). If the smart meter does not receive the response, the smart meter determines that the authentication has failed (step S508). However, as shown in FIG. 10, if the smart meter has received the answer 601 within the time period, that is, if the authentication has succeeded by using the fragment information already transmitted from the MDMS, the smart meter determines that the authentication has succeeded without transmitting the third IP packet 503 (step S507). Specifically, only the first and the second ones of the three fragments divided from the second authenticator are transmitted and the transmission of the third fragment is omitted.

Until the MDMS receives all the fragments, the MDMS cannot obtain the second authenticator, so that normally the authentication cannot be performed before the smart meter sends the third IP packet 503, but in the present embodiment, upon the MDMS receiving the second IP packet 502, the MDMS assumes the authentication to have succeeded and transmits the answer 601.

The reason why such processing is possible is because algorithms generally used, such as HMAC, generate a balanced authenticator and therefore a same result as the authentication can be provided only by checking a piece of information (some bit information), without necessarily checking the generated entire information (entire bit information).

Of course, as an amount of the information to be checked decreases, the security deteriorates. Therefore, it is desirable to check the entire information. However, while a network is being congested or a server processing load of the MDMS is high, there is no room for processing a large number of packets. Therefore, if information to be checked is reduced to allow the processing to proceed, sometimes higher security may be provided compared with forcing all the packets to be processed to make authentication processing become slow. In the present embodiment, as a procedure that can address such a case, as described before, a mechanism is adopted in which if after the second IP packet 502 is sent, the answer 601 indicating successful authentication is received within a certain time period, the third IP packet 503 is not transmitted.

In the description, the second authenticator is divided into three fragments, but the division number is not limited as long as it is 3 or more, and when the answer 601 is received during sequentially sending a plurality of fragments, the transmission of subsequent fragments may be omitted. That is, if the division number is n, when authentication success is received after the second packet transmission and before an x-th (x is an integer being larger than 2 and n or less) packet transmission, the transmissions of the x-th to the n-th packets may be omitted. As a result, a useless packet that is no longer used by the MDMS can be prevented from being transmitted on the network. The property is desirable especially as an action while a network is being congested or the MDMS server is under a high load.

Thus, according to the present embodiment, in a case where a plurality of IP packets are transmitted to perform authentication, the number of IP packets to be transmitted for authentication is dynamically reduced while a network is being congested or a server is under a high load, and thereby higher communication performance can be provided.

Third Embodiment

In the present embodiment, the answer 601 indicating successful authentication includes information flags indicating whether authentication has succeeded by the first authenticator or by the second authenticator, and the smart meter checks the received answer 601 to know which of the authenticators has passed. It should be noted that hereinafter, an authenticating scheme based on the first authenticator is referred to as a first authenticating scheme and an authenticating scheme based on the second authenticator is referred to as a second authenticating scheme.

In the description of the above-described embodiments, since the processing has been sequentially described, the description might be read as if when the authentication succeeds by using the first authenticator, the smart meter receives the answer 601 before the transmission of the second IP packet, and when the authentication succeeds by using the second authenticator, the smart meter receives the answer 601 after the transmission of the second IP packet at earliest. However, actually, because a time that a packet flows on a network is not zero, the sequence may be altered. In particular, if a processing load of the MDMS is high or a path of a network is congested, the smart meter may receive the answer 601 after the entire authentication processing (both the authentication by the first authenticator and the authentication by the second authenticator).

Therefore, a state of authentication can be known by the answer 601 including the information flags for confirmation.

Figure 13:
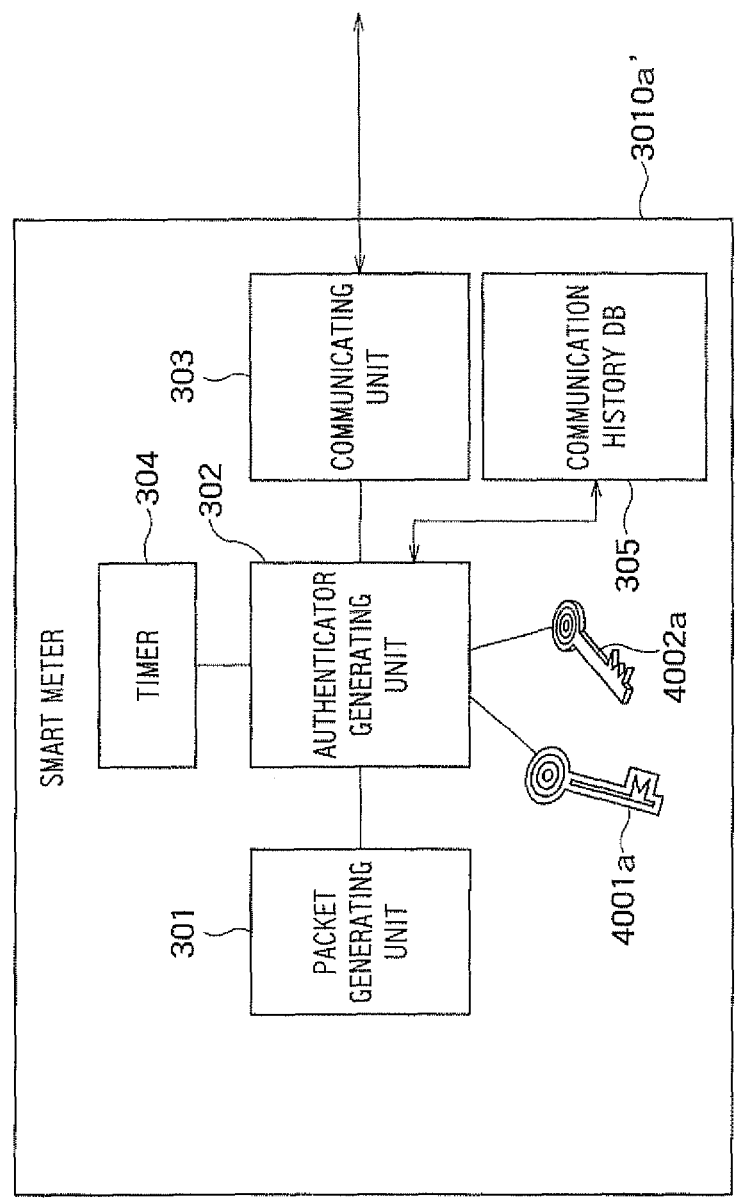
FIG. 13 is a schematic block diagram of a smart meter according to the third embodiment.

This information, namely, the information indicating whether the authentication has succeeded by the first authenticator or by the second authenticator is stored in the communication history database 305 accessible by the authenticator generating unit 302 as shown in smart meter 3010a' in FIG. 13, and using the information allows efficient communications described below.

Because an opposite communication party (a destination device) with respect to a smart meter is a device related to power network monitoring such as an MDMS, the smart meter repeatedly communicates with a number of fixed opposite parties. In addition, because a communication path to a same opposite party is rarely changed, it is highly likely that a field of an authenticator that passed in a previous communication can also pass in a next communication.

Records of the information flags for confirmation are stored in a communication history database. FIG. 12 shows an example in which the information flags are recorded on the communication history database. An "NG" (No Good) of the second authenticator means a case in which although the first to the third packets are transmitted, authentication success has not returned. Also, the "NG" may include a case in which the authentication of the first authenticator has been performed so quickly that the second or the third packet has not been transmitted.

Figure 14:
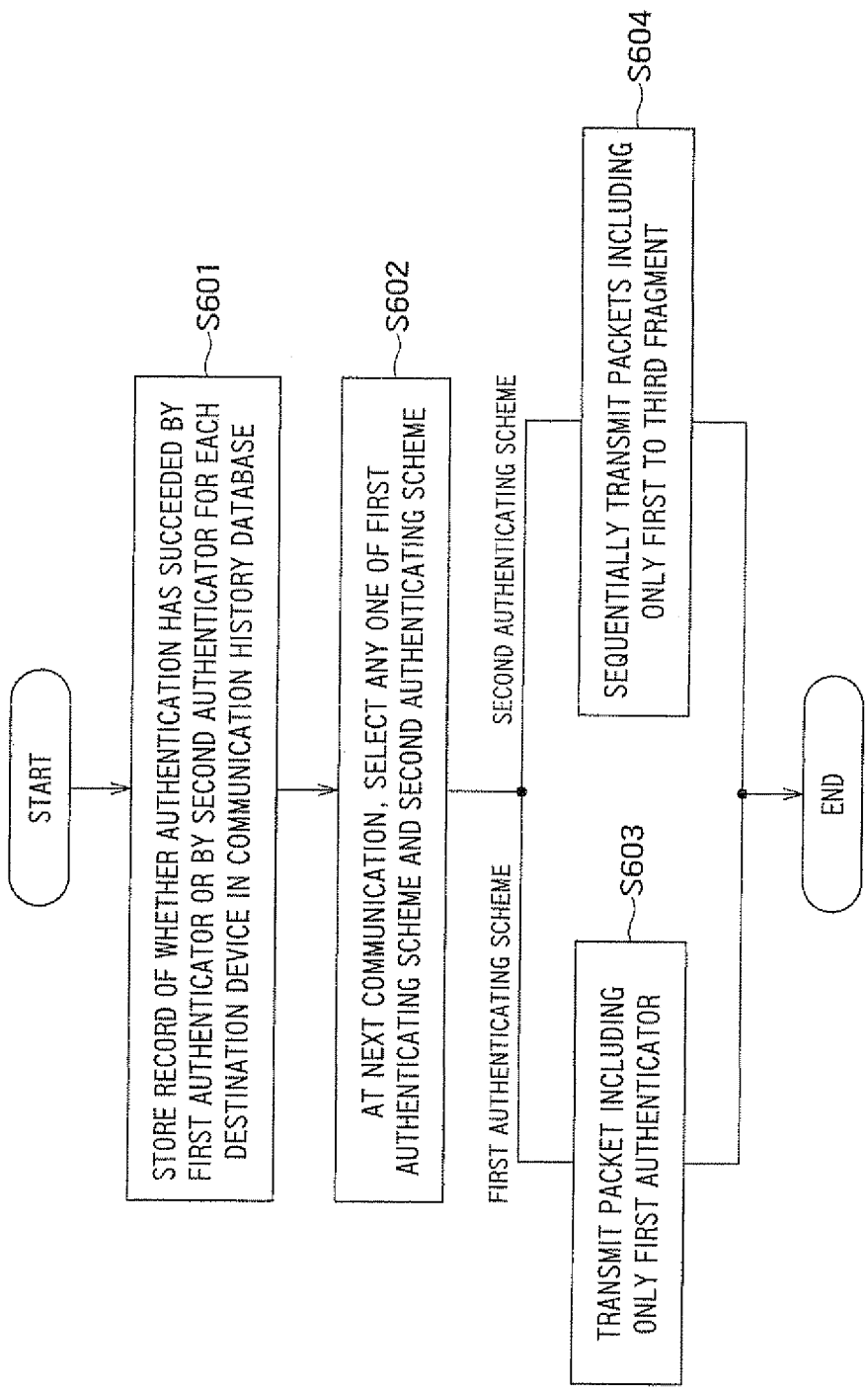
FIG. 14 is a flow chart showing a flow of an operation of the smart meter of the third embodiment.

As shown in a flow chart of FIG. 14, the smart meter of the present embodiment stores a record of whether the authentication has succeeded by the first authenticator or by the second authenticator for each destination device each time (step S601), and can change an authenticating scheme to another one to be used in a next communication based on the history (step S602). For example, if the smart meter determines whether or not the first authenticator can pass, depending on whether or not the first authenticator has passed in a most recent communication, a substantially correct result can be obtained. In addition, if the records show that the first authenticators have passed with high probability, it is highly likely that a next first authenticator can also pass.

If the first authenticating scheme is selected, the first packet including the first authenticator and not including a fragment is transmitted (step S603). On the other hand, if the second authenticating scheme is selected, the first to the third packets including the first to the third fragments (the first authenticator does not include either) are sequentially transmitted (step S604).

In the example of FIG. 12, the records include previous three transmissions to the MDMS-1, and since any of the three times indicates that the first authenticator has passed, it is extremely highly likely that the first authenticator can pass also in a next transmission to the MDMS-1, so that the first authenticating scheme is selected to perform packet transmission (step S603). In this case, because calculation for the second authenticator can be omitted, the processing can be light. Moreover, because this case obviates the need to wait for the answer 601 to determine whether or not the second IP packet is transmitted after the transmission of the first IP packet, the processing for this part can also be eliminated.

On the other hand, if it is certain that the first authenticator cannot pass, as described above, the second authenticating scheme is selected to sequentially transmit the first to the third packets including the first to the third fragments (step S604). In this case, because calculation for the first authenticator can be omitted, the processing can be light. Because this case obviates the need to add the first authenticator to an IP packet, a size of transmitted data may be small. In the example of FIG. 12, it is hardly likely that a first authenticator can be used in communications with the MDMS-2, and only a second authenticator should be used.

It should be noted that the described judgment based on the history may turn out to be wrong, though the probability is low. For example, an Internet provider may change a network configuration, a router, or a packet filtering rule. In such a case, authentication might fail, but there arise no problems. It is because a large number of communication protocols such as TCP/IP have a packet retransmitting function in case of communication failing and failure is recorded, so that at the time of retransmission, an authenticator can be added in a manner that provides communications again. That is, if the authentication by a packet transmitted in step S603 fails, retransmission is performed by the second authenticating scheme, and if the authentication fails in step S604, retransmission may be performed by the first authenticating scheme.

In such a procedure, second or later communications can be more efficient by using history of information flags for confirmation.

Thus, according to the present embodiment, by keeping history indicating which of authenticating schemes has established connections in the communication history database and using the history, subsequent communications may also be performed by selecting a more high-speed scheme.

The first to the third embodiments described above can provide efficient data authentication of network devices in a smart grid and lowered operation costs.

The invention claimed is:

1. A data transmitting apparatus for communicating with a destination device, the destination device performing an authentication process based on an authenticator, the data transmitting apparatus comprising:
    an authenticator generating unit configured to generate a first authenticator by using a first encryption key and generate a second authenticator by using a second encryption key, divide the second authenticator into first to n-th (n is an integer greater than or equal to 2) fragment information items, select the first fragment information item out of the first to n-th fragment information items and generate a first packet including both of the first authenticator and the first fragment information item; and
    a communicating unit configured to transmit the first packet to the destination device, wherein, if a response indicating success of the authentication process based on the first authenticator is not received from the destination device within a certain period after the first packet is transmitted, the authenticator generating unit selects each one of the second to the n-th fragment information items and generates second to n-th packets each including a respective one of the second to n-th fragment information items, and the communicating unit sequentially transmits the second to n-th packets to the destination device.

2. The apparatus according to claim 1, further comprising a communication history database,
    wherein the communicating unit receives from the destination device a response indicating the success of the authentication process by the first authenticator or a response indicating the success of the authentication process by the second authenticator;
    the communication history database stores a record of information on the response with respect to the destination device; and
    the authenticator generating unit selects, based on the communication history database, which of the authentication process by the first authenticator and the authentication process by the second authenticator is to be requested; and
    wherein the communicating unit generates and transmits, if the authentication process by the first authenticator is selected by the authenticator generating unit, a packet including the first authenticator and not including any one of the first to the n-th fragment information items to the destination device, and the authenticator generating unit selects, if the authentication process by the second authenticator is selected by the authenticator generating unit, each one of the first to n-th fragment information items and generates first to n-th packets each including a respective one of the first to n-th fragment information items and not including the first authenticator, and the communicating unit sequentially transmits the second to n-th packets to the destination device.

3. The apparatus according to claim 2, wherein the authenticator generating unit selects a most recently successful authentication process out of the authentication process by the first authenticator and the authentication process by the second authenticator.

4. The apparatus according to claim 2, wherein the authenticator generating unit selects the authentication process having a larger number of successes out of the authentication process by the first authenticator and the authentication process by the second authenticator.

5. A data transmitting method for a data transmitting apparatus configured to communicate with a destination device, the destination device performing an authentication process based on an authenticator, the method comprising:
generating a first authenticator by using a first encryption key and generating a second authenticator by using a second encryption key, dividing the second authenticator into first to n-th (n is an integer greater than or equal to 2) fragment information items, selecting the first fragment information item out of the first to n-th fragment information items and generating a first packet including both of the first authenticator and the first fragment information item;
transmitting the first packet to the destination device; and
selecting each one of the second to n-th fragment information items if a response indicating success of the authentication process based on the first authenticator is not received from the destination device within a certain period after the first packet is transmitted and generating second to n-th packets each including a respective one of the second to n-th fragment information items;
sequentially transmitting the second to n-th packets to the destination device.

6. The method according to claim 5, further comprising:
receiving from the destination device a response indicating the success of the authentication process by the first authenticator or a response indicating the success of the authentication process by the second authenticator;
storing a record of information on the response with respect to the destination device in a communication history database;
selecting, based on the communication history database, which of the authentication process by the first authenticator and authentication process by the second authenticator is to be requested;
generating and transmitting, if the authentication process by the first authenticator is selected, a packet including the first authenticator and not including any one of the first to the n-th fragment information items to the destination device; and
selecting, if the authentication process by the second authenticator is selected, each one of the first to n-th fragment information items and generating first to n-th packets each including a respective one of the first to n-th fragment information items and not including the first authenticator, and sequentially transmitting the second to n-th packets to the destination device.

7. The method according to claim 6, wherein the selecting of which of the authentication process by the first authenticator and authentication process by the second authenticator is to be requested includes selecting a most recently successful authentication process out of the authentication process by the first authenticator and the authentication process by the second authenticator.

* * * * *